Sept. 21, 1954 D. B. SPALDING 2,689,614
JET-ROTATED HELICOPTER OR OTHER ROTOR
Filed Oct. 4, 1951 2 Sheets-Sheet 1

Inventor
Dudley B. Spalding
By Stevens, Davis, Miller & Mosher
his Attorneys

Sept. 21, 1954  D. B. SPALDING  2,689,614
JET-ROTATED HELICOPTER OR OTHER ROTOR
Filed Oct. 4, 1951  2 Sheets-Sheet 2

Inventor
Dudley B. Spalding
By Stevens, Davis, Miller & Mosher
his Attorneys

Patented Sept. 21, 1954

2,689,614

UNITED STATES PATENT OFFICE 2,689,614

JET-ROTATED HELICOPTER OR OTHER ROTOR

Dudley B. Spalding, Cambridge, England, assignor to National Research Development Corporation, London, England Application October 4, 1951, Serial No. 249,691

Claims priority, application Great Britain May 16, 1951

7 Claims. (Cl. 170—135.4)

1

This invention relates to bladed rotors for aircraft propulsion of the kind comprising blades fitted with propulsive ducts (e. g. one duct per blade) which take in a stream of air, raise its pressure by diffusion and its velocity by the combustion of fuel in it, and allow the resultant gases to expand as propulsive jets the reaction to which rotates the rotor.

Bladed rotors according to the invention are applicable mainly as helicopter rotors, but not exclusively so since they may also be used as jet-rotated airscrews.

As propulsive ducts it is primarily the kind generally known as "ram jets" which are envisaged. It is however within the scope of the invention to use propulsive ducts which are supplied with air by a mechanical compressor which may be accommodated in the fuselage of the helicopter or other aircraft to which the rotor is fitted.

The invention represents the application to aircraft-propulsion bladed rotors of the kind referred to above of combustion apparatus according to the applicant's co-pending U. S. A. application No. 209,378, filed February 5, 1951.

The present invention provides a bladed rotor for aircraft propulsion (such as a helicopter rotor) of the kind comprising blades fitted with propulsive ducts which take in a stream of air, raise its pressure by diffusion and its velocity by the combustion of fuel in it, and allow the resultant gases to expand as propulsive jets the reaction to which rotates the rotor, characterised in that the combustion system of each duct comprises rods, arranged gridwise, mounted so that they lie in a direction generally lengthwise of the blades and extend transversely to the airflow through the duct, and means for supplying liquid fuel to the rods so that, by centrifugal force arising from the rotation of the rotor, fuel is spread over the rods as a film which is stably combustible in the airflow.

The rods may be substantially radial relative to the centre of the rotor.

Alternatively the rods may be so inclined from the truly radial direction relative to the centre of the rotor that the airflow in the duct exerts on the fuel film a component of force opposed to the outward spreading of the fuel under the effect of centrifugal force.

It appears advantageous to construct the propulsive ducts of substantially rectangular cross-section, at least in the combustion zone, since in this way all the rods may be of about the same length, which facilitates properly balanced fuel distribution as between the different rods.

To assist the further understanding of the invention examples of it as applied to helicopter rotors fitted with propulsive ducts of the ram jet type will now be described in some detail with reference to the accompanying drawings in which.

The arrows A in Figures 3, 4, 5, 6, 8 and 9 indicate the direction of movement of the ram jet duct.

Figure 1:
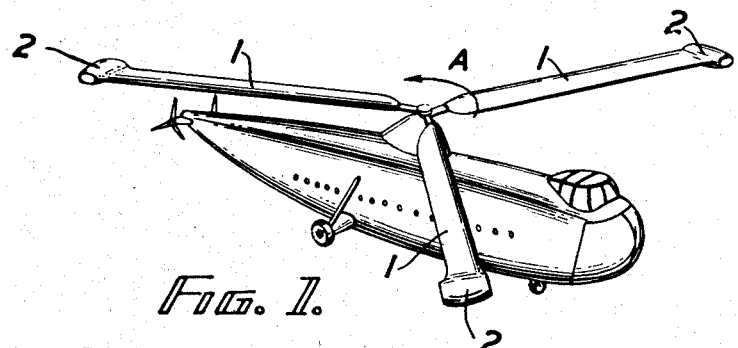
Figure 1 is a perspective view of a helicopter aircraft fitted with a rotor according to the invention.

Referring to the drawings Figure 1 shows the general organisation of a helicopter aircraft fitted with a bladed rotor comprising blades 1 each of which is fitted at the tip with a ram jet unit 2 for the rotation of the rotor.

Figure 2:
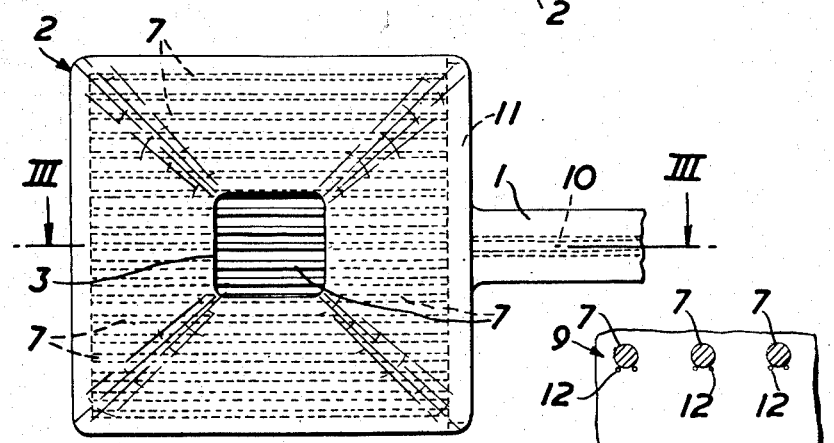
Figure 2 is a frontal view of one of the ram jet units.
Figure 3:
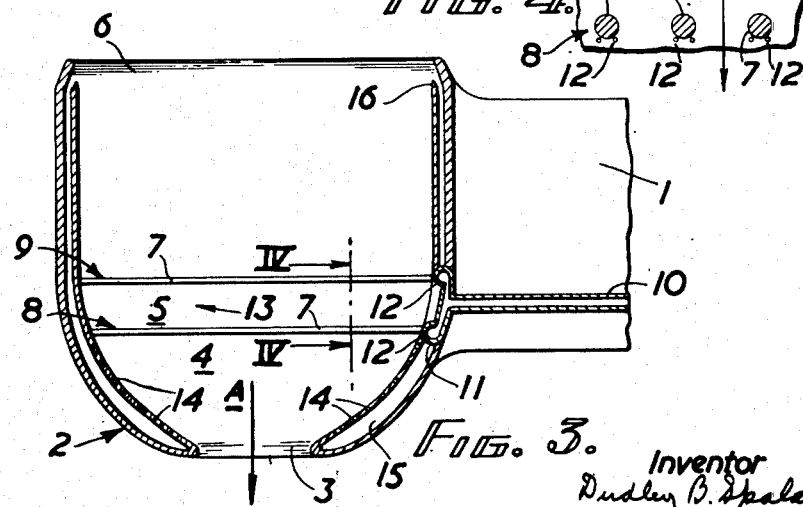
Figure 3 is a section along the line III—III in Figure 2.
Figure 5:
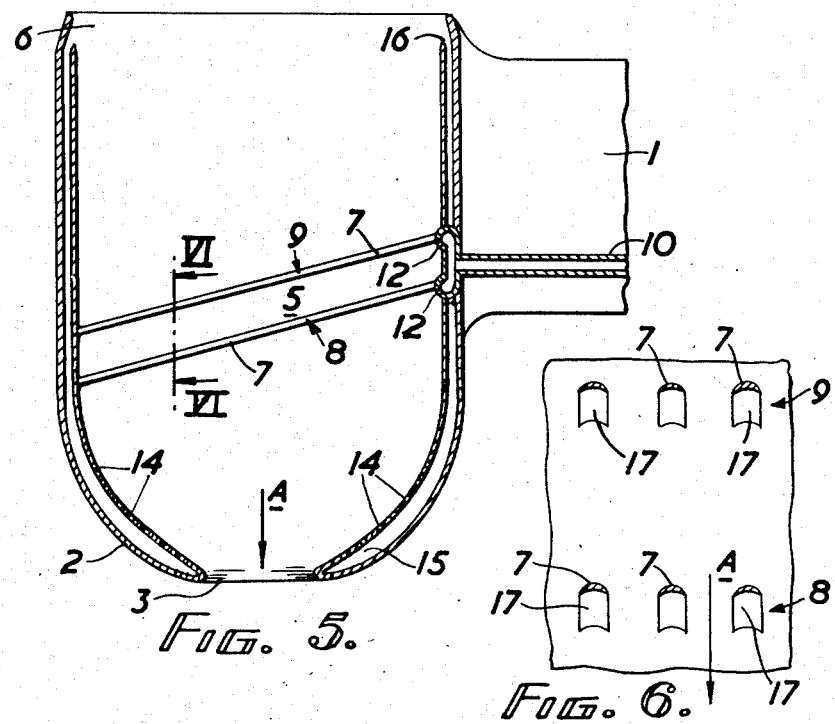
Figure 5 is a view similar to Figure 3 and shows a modified form of ram jet unit.
Figure 6:
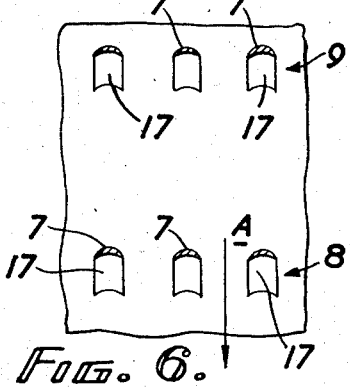
Figure 6 is a section through the burner rods on the line VI—VI in Figure 5.

From Figures 2 and 3 it will be seen that each of the ram jet units consists of a hollow duct of rectangular section having an intake opening 3, a diffusion zone 4, a combustion zone 5 and a convergent nozzle 6. It will be understood that these ram jet units function in known manner by taking in air through the intake 3, compressing this air by the ram effect and by diffusion in zone 4, and raising the temperature and velocity of the air by combustion of fuel in the zone 5, thus producing gases which expand in the nozzle 6 to furnish a gaseous jet exerting thrust in an approximately tangential direction. The reaction to this thrust effects the continued rotation of the rotor once this has been started and brought to an appropriate speed by some auxiliary source of power.

The combustion system of each ram jet unit comprises rods 7 assembled gridwise to form one or more separate and spaced grids or rows which extend transversely of the duct. In the example illustrated there are two such rows 8, 9. The rods lie lengthwise of the blades 1 and are substantially radial with reference to the centre of rotation of the rotor. Liquid fuel, for example kerosene, is supplied through a pipe 10 extending through the rotor blades to a fuel reservoir or well 11 which is accommodated within the hollow walls of the duct. The rods 7 are appropriately secured to the fuel well 11 which closely adjacent to each rod is provided with one or more small orifices such as 12 which allow fuel to pass to the inner ends of the rods. It will be understood that the size of the orifices 12 must be such as to permit a rate of fuel supply appropriate to the working conditions.

Figure 4:
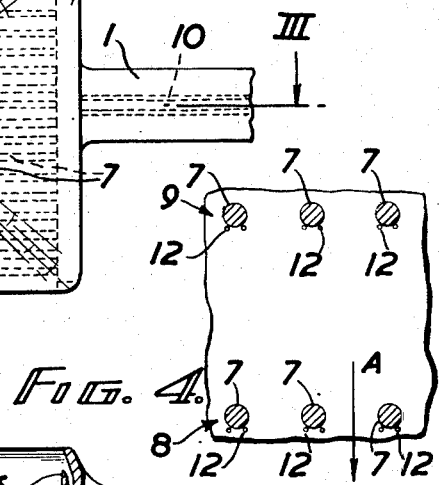
Figure 4 is a section across the burner rods on the line IV—IV in Figure 3.

When the rotor is rotating fuel supplied through the orifices 12 is distributed outwardly by centrifugal force and spreads as a film over the rods. When ignited it is found by practical experiment that the fuel on the rods burns stably in the high velocity air, giving rise to flames extending rearwardly from the rods as indicated at 13. Given a continuous supply of fuel and rods of suitable cross-section this combustion may be expected to continue. It appears desirable to use rods so shaped that when positioned in the duct they present to the oncoming air a cross-section which is bluff (i. e. non-streamlined) so that there may be a zone of reverse flow in the wake of the rods. The latter as indicated at Figure 4 may be of circular section but it appears preferable to use rods of other sections such as triangular (with one apex of the triangle forming the leading edge and possibly with a rearward fin extension to form an arrow head shape) or semi-circular (with the round side as leading face). The rods may indeed be shaped as aero-foils but so positioned in the duct that they are stalled.

The mechanism of combustion appears to be somewhat as follows: During combustion evaporation of fuel takes place from at least the leading surface of the rods. Vapour from this evaporation mixes with oncoming air and meets hot combustion products and vapour which have been circulated in reverse flow vortices in the wake of the rod. Heat from the rearwardly extending flame 13 is transferred to the rods and thus provides the necessary latent heat to evaporate more fuel.

The second row of rods 9 are positioned in the wakes of the rods forming the first row so that the former are swept by gases at a very high temperature and evaporate their fuel at a rate considerably greater than that of the first row.

The mechanism of combustion and the most suitable rod section are dealt with in more detail in applicant's co-pending application referred to above.

In order to reduce the length of the ram jet duct the walls of the diffusion zone 4 diverge at a wide angle such that boundary layer breakaway is possible. To secure the appropriate shape of the duct a double-walled construction is necessary and in the zone 4 the inner wall is provided with small holes, slots or pores 14 and the space 15 between the walls is in communication with an annular opening 16 in a low pressure region of the ram jet duct, so that in operation the boundary layer adjacent the walls in the zone 4 will be sucked away.

The high air velocity may tend to tear the fuel from the rods in the form of droplets. To avoid this the modification shown in Figures 5 and 6 may be adopted according to which the rods are in one plane slanted away from the truly radial direction so that their outer ends lie upstream of the inner ends (see Figure 6), the duct being made somewhat longer to accommodate this modification. The individual rods are provided on their leading faces with longitudinal recesses 17 in the nature of "gutters." It will be seen that in operation the centrifugal force tends to hold the fuel in the recesses 17 and the airflow in the duct exerts on the fuel film a force opposed to the outward spreading of the fuel. Obviously the slant of the rods must be such that centrifugal and aerodynamic forces are appropriately balanced.

Figure 7:
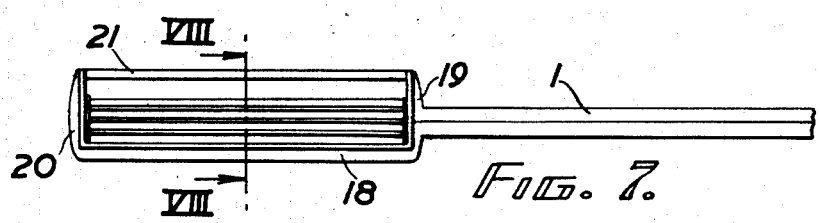
Figure 7 is a fragmentary view of the trailing edge of a modified rotor blade unit.
Figure 8:
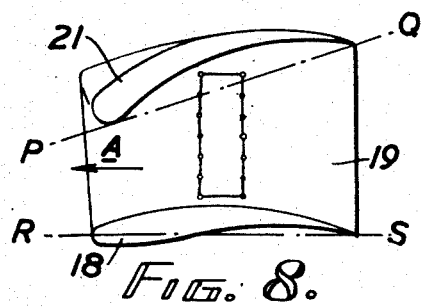
Figure 8 is a section on the line VIII—VIII in Figure 7.

The rectangular sectional shape of the ram jet duct is preferable in that it permits the use of rods of equal length thus facilitating the equal distribution of fuel as between different rods. This rectangular shape offers the possibility of constructions such as those illustrated in Figures 7 to 9 according to which the upper and lower walls of the duct may be formed by aero-foils which have the advantage that these contribute to the lift of the blade. Thus the blade 1 may be extended to form an upright wall portion 19 and a lower aero-foil portion 18 which terminates at the tip in an upright wall portion 20 similar to 19. Between the walls 19 and 20 is located an upper aero-foil member 21 forming the fourth wall of the ram jet duct. As shown in Figure 8 the passage between the aero-foils 18 and 22 requires to have the necessary divergent intake and convergent nozzle, this being achieved by positioning the upper aero-foil 21 so that the chord line PQ joining the leading edge to the trailing edge which forms an angle with the corresponding line RS of the lower aero-foil 18. The rods are combined in a common grid structure 23.

It should be stressed that the drawings referred to above are of a diagrammatic nature only and that the requirements of practical aircraft structure may necessitate departure as to details from what is shown in the drawings.

What I claim is:

1. A bladed rotor for aircraft propulsion comprising blades, propulsive ducts carried by the blades, each duct taking in a stream of air, of which the pressure is raised by diffusion and the velocity is raised by the combustion of fuel within the duct, the resultant gases being allowed to expand as a jet providing a propulsive rotational force to the rotor and, in each duct, a combustion system which comprises rods, which extend in a direction so inclined from the truly radial direction relative to the center of the rotor that the outer ends of the rods are positioned upstream of the inner ends and which are positioned transversely to the airflow through the duct, and means for supplying liquid fuel to the rods; the fuel spreading, under the resultant action of the centrifugal force arising from the rotation of the rotor and an opposing component, due to the inclination of the rods from the truly radial direction, of the force, exerted by the airflow in the duct, over the surface of the rods as a film which is stably combustible in the airflow.

2. A bladed rotor according to claim 1, wherein each rod comprises a longitudinal recess in the nature of a gutter for the retention of fuel, and is positioned so that the recess is on the leading face of the rod relative to the airflow.

3. A bladed rotor according to claim 1, wherein the rods are positioned in at least two parallel rows extending transversely of the duct and spaced apart in the direction of the length of the duct.

4. A bladed rotor according to claim 1, wherein the propulsive ducts, at least in the combustion zone thereof, are of substantially rectangular cross-section.

5. A bladed rotor according to claim 4, wherein two sides of each propulsive duct are formed by a pair of spaced aero-foils forming a continuation of a rotor blade.

6. A bladed rotor according to claim 1, wherein an upstream and diffusing region of the propulsive duct has an apertured or porous wall section, the apertures or pores of which communicate with a downstream region of lower pressure, so that in operation the boundary layer of air in the diffusing region is sucked away.

7. A bladed rotor for aircraft propulsion comprising blades, propulsive ducts carried by the blades, each duct defining an air flow passage therethrough, a combustion system in the duct which comprises imperforate rods extending in a direction substantially radial relative to the centre of the rotor and positioned transversely to the airflow passage defined by the duct and means for supplying liquid fuel to the outer surfaces of said rods at their radially inner ends, whereby the fuel will spread as a film over the said outer surfaces by centrifugal force arising from the rotation of the rotor.

References Cited in the file of this patent

UNITED STATES PATENTS

| Number | Name | Date |
| --- | --- | --- |
| 2,262,013 | Lang | Nov. 11, 1941 |
| 2,510,572 | Goddard | June 6, 1950 |
| 2,589,945 | Leduc | Mar. 18, 1952 |

FOREIGN PATENTS

| Number | Country | Date |
| --- | --- | --- |
| 614,621 | Great Britain | Dec. 17, 1948 |